United States Patent [19]
Kuzyk

[11] 3,744,316
[45] July 10, 1973

[54] ULTRA-LOW FLUID PRESSURE AND ULTRA-LOW FORCE MEASURING APPARATUS

[75] Inventor: Roman Kuzyk, Trenton, N.J.
[73] Assignee: Honeywell Inc., Minneapolis, Minn.
[22] Filed: Aug. 26, 1971
[21] Appl. No.: 175,183

[52] U.S. Cl. .............................. 73/398 C, 73/419
[51] Int. Cl. ............................................. G01l 9/12
[58] Field of Search ........................ 73/398 R, 419

[56] References Cited
UNITED STATES PATENTS
3,383,922   5/1968   Seamans, Jr. ......................... 73/419

OTHER PUBLICATIONS
Hutton, "A Filting Air–Lubricating Piston Gage....", Journal of Research of National Bureau of Standards, Vol. 63c, No. 1, July–Sept. 1959. Pages 47–57.

Primary Examiner—Donald O. Woodiel
Attorney—Arthur H. Swanson et al.

[57] ABSTRACT

An ultra-low fluid pressure and force measuring apparatus whose accuracy is limited only by the friction introduced by a substantially frictionless hydrodynamic air bearing formed between an inside of a cylinder and an outer surface of a piston against one or both ends of which a pressure or force under measurement is applied. Capacitor plates mounted on the cylinder and moveable piston form a sensor for a force balanced capacitance feedback circuit which in turn transmits an electrical signal to: No. 1. an indicator to show the degree of displacement of the piston due to the difference in magnitude of the apposing fluid pressures or forces acting on the piston and No. 2. to a stator that surrounds an armature within said piston to rotate same and to apply an axial rebalancing magnetic force thereto.

10 Claims, 6 Drawing Figures

Patented July 10, 1973  3,744,316

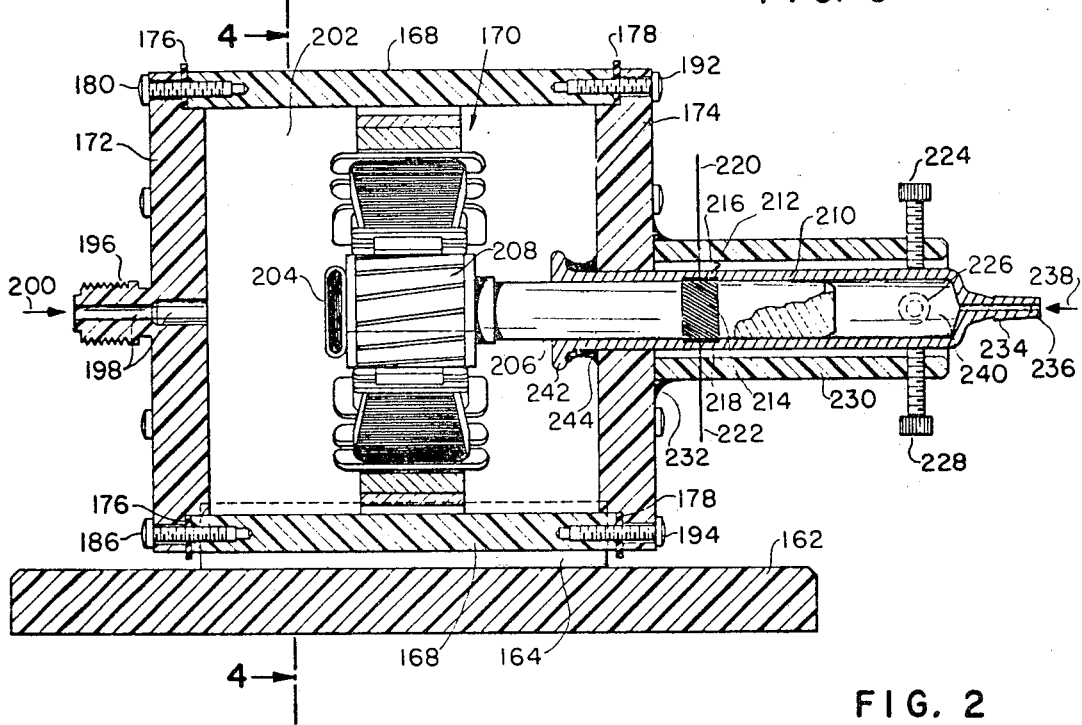
FIG. 5
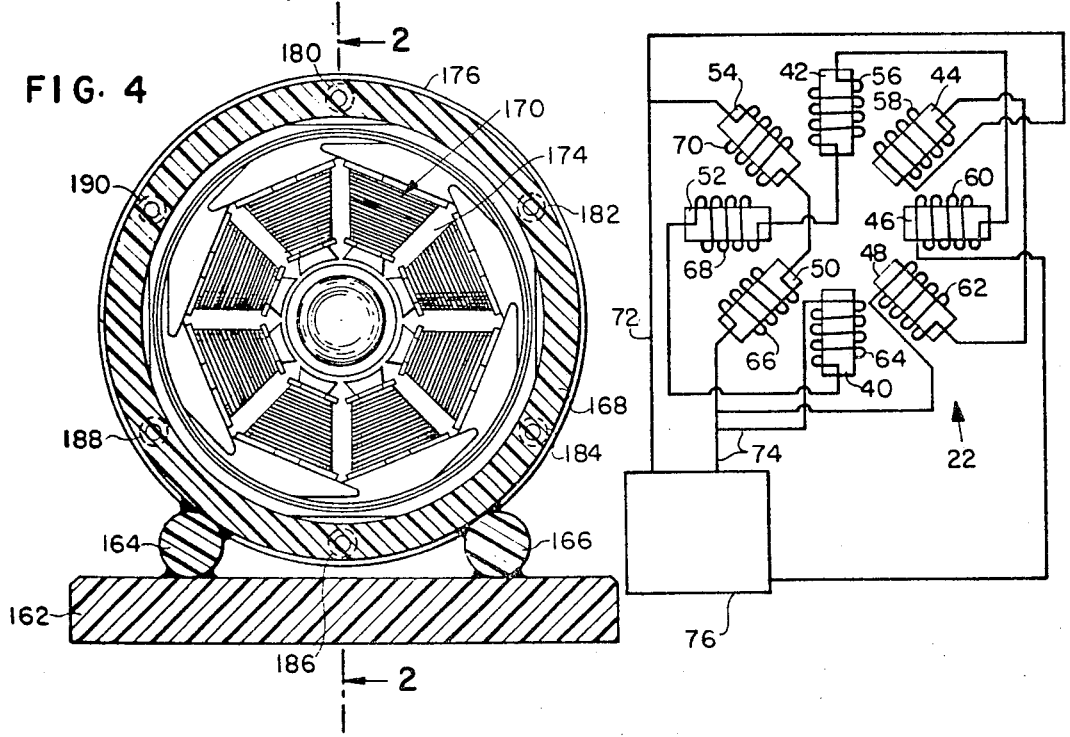
FIG. 4
FIG. 2

ULTRA-LOW FLUID PRESSURE AND ULTRA-LOW FORCE MEASURING APPARATUS

The May 1947, Volume 18, No. 5 article in the Review of Scientific Instruments by Howard F. Brubach, entitled "Some Laboratory Applications of the Low Friction Properties of the Dry Hypodermic Syringe" notes that when a fixed large volume of air, for example, 100 liters are connected to one end of a rotating syringe and a volume of, for example, 0.10 cc is introduced at the opposite ends of the syringe the piston will be displaced the same volume as the amount of the air introduced and that a reading of the introduced volume of fluid can be determined by noting the scale marks on the outer wall of the syringe over which the piston has been displaced.

The aforementioned article by Brubach further notes that it is not possible to use a rotary syringe of the aforementioned type to measure displacements which occur when the volume is of a smaller value than that noted is desired, because of the difficulty of distinguishing the small degree of displacement along with the scale marks on the outer wall of the syringe.

It has not heretofore been possible to provide an accurate ultra-low pressure or an ultra-low force sensing and measuring apparatus that is capable of detecting and measuring the magnitude of an ultra-low fluid pressure or force or difference in two ultra-low pressures or forces whose values are as low as $7 \times 10^{-5}$ PSI and $7 \times 10^{-7}$ LBS respectively because it has been difficult to read such small measurements on a scale as noted supra and/or because the friction that is inherent in the moving parts of instruments which have been used for this purpose produce inaccurate measurements.

SUMMARY OF THE INVENTION

A substantially frictionless apparatus that is capable of accurately measuring and indicating in a continuous manner the changes that occur in ultra-low fluid pressures and/or forces by employing:

1. A capacitor type sensor to sense small displacements that occur between a unitary piston and an armature unit that is mounted for rotary and longitudinal movement within a cylinder on a substantially frictionless hydrodynamic air bearing as the pressures or forces to be measured are applied to one or both ends of the piston to move it in a longitudinal direction and 2. A force balance capacitance feedback system associated with the sensor to (a.) transmit a rebalancing magnetic force to a stator that in turn is employed to continuously rotate the piston and armature unit and to (b.) simultaneously transmit a signal to an indicator to indicate the magnitude of the ultralow pressures and/or forces under measurement.

A better understanding of the present invention may be had from the following detailed description when read in connection with the accompanying drawing in which;

FIG. 2 is a view of the electromagnets and coils of the stator taken along the section line 2—2 of FIG. 1 and FIG. 4;

FIG. 4 is a section taken along the lines 4—4 of FIG. 5 and further shows how the stator of FIG. 1 can be mounted in a housing;

FIG. 5 is a sectional view of the ultra-low pressure or force measuring apparatus of FIG. 4 and further shows how the stator and cylinder of FIG. 1 can be mounted on a housing and;

Figure 1:
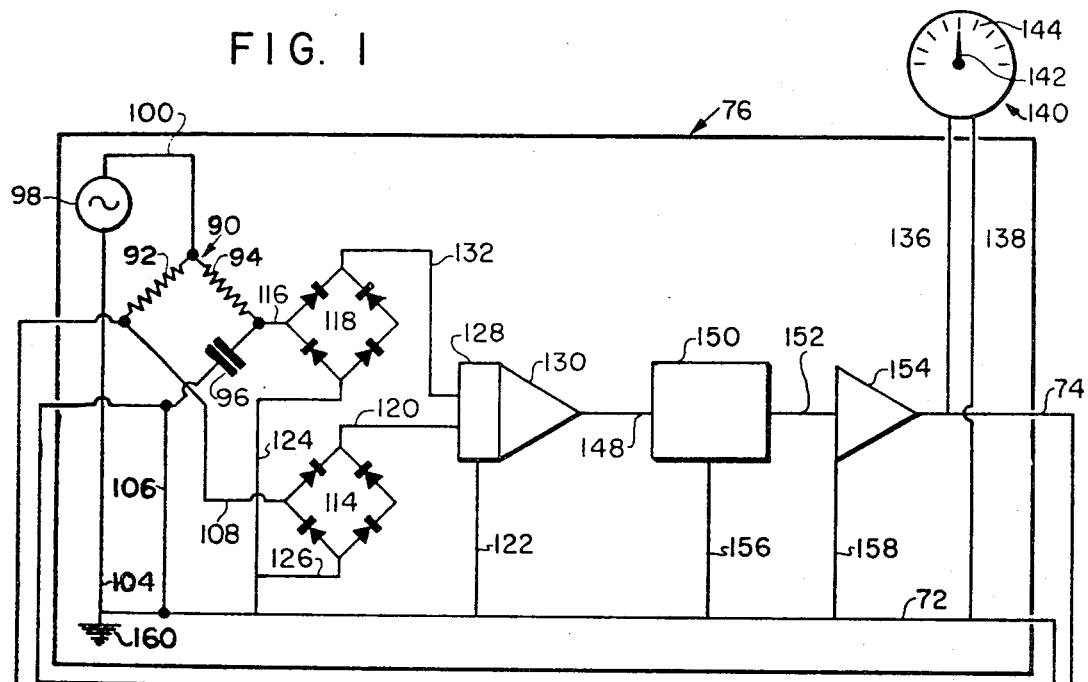
FIG. 1 shows an overall view of the ultra-low fluid pressure and ultra-low force measuring apparatus with the piston and cylinder in cross section to indicate the force balance position the stator and cylinder will be in when the magnetic centralizing force being applied by the stator to the armature has been made equal to the applied pressure or force applied to one or both ends of the piston.
Figure 1:
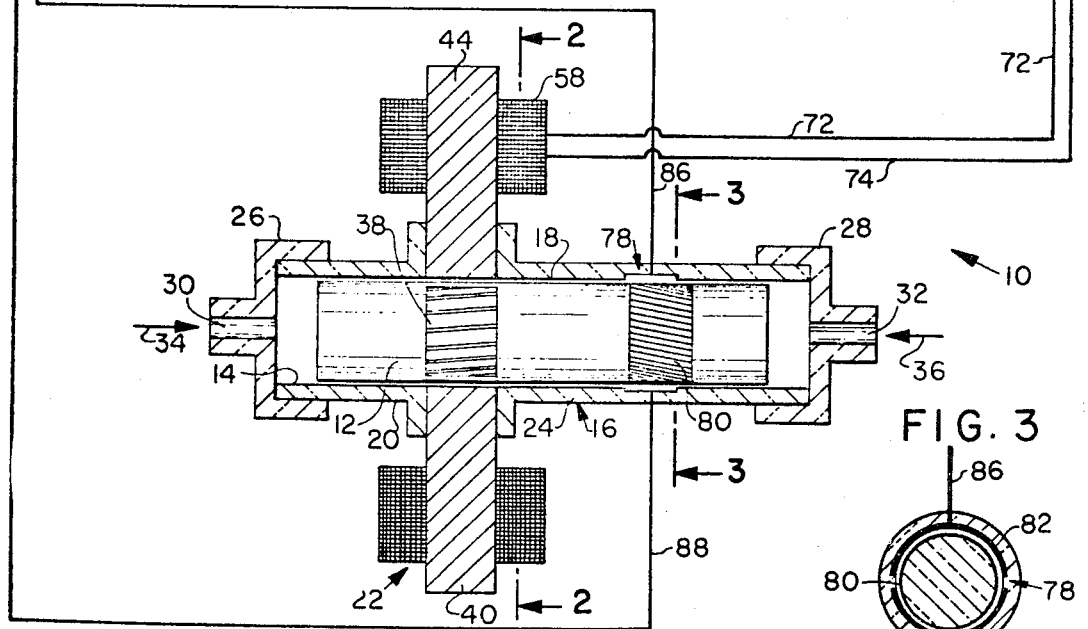
Figure 3:
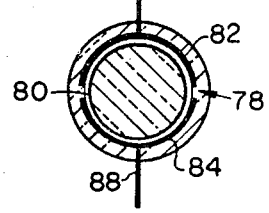
FIG. 3 is a sectional view of the capacitance plates taken along the section line 3—3 of FIG. 1.

The ultra-low fluid pressure measuring apparatus 10 shown in FIG. 1 has a piston 12 mounted in close proximity with the internal wall 14 of a cylinder 16. The finish of the external peripheral surface 18 of the piston 12 and internal surface 14 of the cylinder 16 have substantially the same respective outside diameter and inside diameters as a ground glass low friction finish similar to that employed in dry hypodermic fluid injecting syringes.

The cylinder 16 is comprised of a left end portion 20, a stator 22 of the type used in squirrel cage motors, a right end portion 24 and two end portions 26, 28. The end portion 26, 28 have ports 30, 32 into which a separate one of two different fluids whose difference in pressures to be measured can be applied in the direction of the arrows 34, 36. Alternatively, a single pressure measurement can be applied by way of either one of the ports 30, 32 to the end of the piston 12 that is associated with the inlet through which the pressure is being applied while the opposite end of the piston is exposed to atmospheric pressure.

The piston 12 is provided with a built-in armature 38 which may be of the same general type as that employed in a squirrel cage motor. The stator 22 is made of a plurality of electromagnets 40 – 54 and associated electrically connected coils 56 – 70 as is best shown in FIG. 2. The stator in turn is connected by the electrical conductors 72, 74 to a force balanced type measuring circuit 76.

The measuring circuit 76 employs a variable capacitor 78 to accurately sense the very small displacements of the piston 12 in the cylinder 16 that occur when an ultra-low fluid pressure or force measurement is being made with the apparatus 10.

The variable capacitance sensor 78 is comprised of a very thin broad band of vacuum coated conductive material 80 which forms an outer peripheral surface portion of the piston 12 and two very thin uniformly vacuum coated conductive plates 82, 84 with electrical conductors 86, 88 extending therefrom.

Experimentation has shown that if these coatings 80, 82, 84 are kept very thin, a tolerance of 15 millionths of an inch can then be maintained as an air gap clearance between the outer coated wall of the piston 12 and the inner coated wall of the cylinder 16 so that the piston will always be supported on a hydrodynamic air bearing during the spinning action that takes place between its armature 38 and stator 22 and during the time in which it is being longitudinally displaced to the right or left of the position shown by a fluid pressure or force acting on either or both ends of the piston 12.

As the aforementioned elongated piston 12 is displaced to the right or left of its position shown in FIG. 1, due to a change in a fluid pressure or force under measurement being applied to either the right end, the left end or both ends of the piston 12, the conductive coating 80 forming a part of the variable capacitor 78 on the piston 12 will also be simultaneously displaced in the same direction with respect to the conductive coatings 82, 84 on the inner wall of the cylinder 16, which forms other portions of this variable capacitor 78.

This capacitor 78 is connected by way of associated conductors 86, 88 to a capacitive bridge 90 which has a first resistor 92 forming one of its legs, a second resistor 94, forming a second leg, a reference capacitor 96 in a third leg and the variable capacitance sensor 78 as the fourth leg. Power to the bridge 90 is applied through an oscillator 98 having a lead 100. The oscillator is connected to one part of the bridge 90 by means of conductor 100 and to another portion of the bridge by means of conductors 104, 106.

The electrical output signal produced by the portion of the a.c. bridge 90 that contains the variable capacitor 78 is transmitted by way of the conductor 108 to a full-wave positive rectifier 114.

The electrical signal produced by the portion of the bridge 90 that contains the reference capacitor 96 is transmitted by way of the conductor 116 to a second full-wave negative rectifier 118.

The rectifier 114 is employed to convert changes occuring in the a.c. signal it receives due to changes which take place in the variable capacitor 76 into a D.C. output signal. The last mentioned signal is then transmitted by way of the conductors 120, 122, 72, 124, 126 as a first input signal to a unitary signal adder 128 and signal integrator 130.

The a.c. signal developed across the capacitor 96 in the bridge 90 is converted from an a.c. to D.C. signal by rectifier 118. The last mentioned signal is then transmitted by way of the conductors 132, 122, 72 as a second input signal to the unitary adder an integrator unit 128, 130.

The unit 128 adds the aforementioned first and second signals and their difference is integrated by the integrator 130.

The output signal produced by the integrator is also transmitted by way of conductor 148 to a modulator 150 that is producing a 60 cycle signal.

The magnitude of the signal that is transmitted from the integrator 130 is used to control the magnitude of the 60 cycle signal that the modulator 150 will be able to produce. The 60 cycle output signal produced by the modulator is transmitted by way of amplifier 154 so that it can be boosted to a level sufficient to send the signal by way of conductor 74, 72 through the stator 22 that will generate a magnetic force whose strength is equal to the force being applied to the ends of the piston 12 by the fluid pressure or force that is acting thereon.

The resulting output signal produced by the amplifier 154 is transmitted by way of the conductors 72, 136, 138 to an a.c. voltmeter 140 having a pointer 142 and an indicating scale 144 thereon. This voltmeter 140 will clearly indicate the magnitude of any minute signal change in the fluid pressure being applied in the direction of the arrows 34, 36 to either one or both ends of the piston 12.

The modulator 150 and amplifier 154 are individually connected by way of associate conductors 156, 158 to conductor 72 which in turn is shown grounded at 160 in FIG. 1 of the drawing.

Experimentation has shown that when a change in pressure of a fluid or force at either end of the piston 12 occurs and a magnetic field voltage of the stator 22 is varied in the manner described supra to maintain a constant displacement, the stator voltage will be linearly related to the differential pressure or force under measurement.

FIGS. 4 and 5 of the drawings show an ultra-low pressure measuring apparatus which can perform the same basic pressure and differential pressure flow measurements as those set forth under the descriptions of FIGS. 1 and 2 but which differ from 1 and 2 in that the stator and cylinder are mounted on a housing as will be hereinafter described.

In this regard it should be noted that FIG. 4 shows a base plate 162, a pair of cylindrical support members 164, 166 supported thereon and a hollow sleeve 168 that are made of a suitable plastic material and which are fixedly connected to one another by cement or epoxy at their contacting surface areas to form a single support unit for stator 170.

The ends of the hollow support sleeve 168 are enclosed by means of discs 172, 174 which are held in fluid tight contact therewith by means of gaskets 176, 178 and a suitable number of equally spaced apart screw connections, for example 180 – 194.

The left end disc as shown in FIG. 5 is provided with a suitable threaded connection 196 having an inlet port 198 through which a fluid pressure can be applied in the direction of the arrow 200, to chamber 202 and the left end portion 204 of the piston 206. The piston 206 has an armature 208 mounted for rotary movement in the stator 170 and a left end portion mounted for sliding and rotating movement in the cylinder 210.

The outside diameter of the piston 206 and the inside diameter of cylinder 210 have substantially the same low friction finish and clearances between tham as that employed for the piston 12 and the cylinder portion 16 previously set forth under the description of FIG. 1.

FIG. 5 also shows a variable capacitance sensor 212 comprising a vacuum coated conducting metal plate 214 forming an outer peripheral portion of the piston 206, two vacuum coated metallic plates 216, 218 formed on the inner wall of the cylinder 210 and electrical leads 220, 222 extending therefrom.

The aforementioned sensor 212 and a force balance measuring circuit, not shown which is connected to the leads 220, 222 are of the same type as the sensor 78 and force balance capacitance measuring circuit 76 shown in FIG. 1.

The right end of the cylinder 210 is retained in a rigid spaced apart relationship by four equally spaced apart screws, for example 224, 226, 228 mounted in a support plate of 230 that in turn is fixedly connected to the right side of disc 174 by means of cement or epoxy material 232.

The right end of the cylinder 210 has an embossed portion 234 protruding therefrom that has an inlet port 236 therein through which a fluid pressure can be applied in the direction of the arrow 238 to chamber 240 at the right end of the piston 206.

The left end of the cylinder 210 has a flange portion 242 which is connected to the inner wall of disc 174 by means of epoxy or cement 244 in order to form a means of which this extended left end can be rigidly supported on the disc 174.

The aforementioned apparatus can be beneficially employed to indicate when minute changes in a flow of a fluid such as a gas takes place in a flow line by applying one of the two separate fluid pressures on opposite sides of an orifice in the flow line to one end of either of the aforementioned pistons 12 or 206 shown in FIGS. 1 and 5 and applying the other of the fluid pressures to the opposite end of either of the aforementioned pistons.

Figure 6:
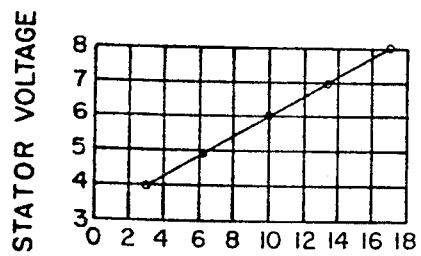
FIG. 6 shows the linear relationship between the magnitude of the pressure differential that is applied to the piston and resulting measured voltage output of the stator.

FIG. 6 shows the linear relationship that exists between a differential fluid pressure flow measurement and the voltage of the stator 22 shown in FIG. 1, or 170 shown in FIG. 5, that is possible to achieve through the use of the aforementioned ultra-low fluid pressure measuring apparatus 10.

It should also be understood that the relationship between a differential force resulting from forces being applied to opposite ends of the piston 12 of FIG. 1 or 206 of FIG. 5 is also advantageously linearly related in a manner similar to that shown in FIG. 6 for a differential pressure.

From the aforementioned description it can be seen that the annular wall portion of a cylinder 16 of FIG. 1 provides a stator 22 for transferring magnetic forces to an armature 38 formed on a piston 12 that is mounted for axial movement in the cylinder 16 in order that the piston can be rotated in a centrally aligned manner with the stator 22. When a change in pressure of fluids or forces which are to be measured occurs, i.e., a single fluid or force applied to one end of the piston 12 or two different fluids or forces applied to the opposite ends of this piston, the piston 12 will be initially displaced an amount that is directly proportional to the magnitude of change in pressure of the fluid or force under measurement and in a direction that is in opposition to the centralizing force of the stator 22.

While the aforementioned displacement of the piston 20 takes place the electrically conducted parts forming capacitance plates 80, 82, 84 which are positioned on the piston 12 and on the inner wall of the cylinder 16 are displaced from one another and an electrical signal is transmitted to a measuring circuit 76. The measuring circuit indicates the magnitude of the pressure or force under measurement on gage 140 and sends a signal to the stator 22 to change the strength of the centralizing axial magnetic force which the stator 22 applies to the armature 38 to a value that will bring the piston 12 to the original position.

It should be noted that the same type of descriptions of how the ultra-low fluid pressure measuring apparatus 10 functions as set forth supra applies equally as well to the measuring apparatus that is shown in FIGS. 4 and 5.

It should also be understood that it is often desirable to maintain the temperature of two different parts of a mold in a fixed temperature relationship with one another and to determine when slight deviations in this relationship occur. This can be accomplished by applying a fixed volume of a gas in a chamber, adjacent one of the parts of the mold whose temperature to be measured, against the left end of the piston 12 and applying a similar fixed volume of a gas, in a chamber adjacent the other part of the mold whose temperature is to be measured, against the right end of the piston 12 before the material in the mold is heated. While the mold is thereafter heated any deviation in the temperature relationship that exists between these two points of the mold will cause one of the two gases to expand at a different rate than the other and the pressure of the gas applied to one end of the piston to become higher than the other. In this way the meter 140 is also useful in instantly indicating when an undesired change in the two parts of the mold occurs.

The embodiments of the invention in which an exclusive property or privilege is claimed are defined as follows:

1. An apparatus to measure the magnitude of a variable that is of an ultra-low magnitude, comprising a chamber, a member having a longitudinal axis mounted for rotary movement about the axis and longitudinal displacement on a hydrodynamic air bearing in said chamber, means for applying said variable to effect said displacement of said member in said chamber, means for rotating said member and applying force to oppose said movement a sensor associated with said member in a wall of the chamber to convert said displacement into an electrical signal which is linearly proportional to the displacement, a force balance feedback circuit operably connected to receive said signal from the sensing means and to simultaneously transmit an output signal to an indicator to indicate the magnitude of said variable thereon and a feedback signal to said means for rotating.

2. The apparatus as defined in claim 1 wherein the member is a piston, the chamber is a cylinder and the variable is a pressure signal which is adapted to be applied to one end of the piston.

3. The apparatus as defined in claim 1 wherein the member is a piston, the chamber is a cylinder and the variable is a force resulting from a difference in the pressure of two fluids each one of which is applied to a different end of the piston.

4. The apparatus as defined in claim 1 wherein the member is a piston, the chamber is a cylinder and the variable is a force which is adapted to be applied to one end of the piston.

5. The apparatus as defined in claim 1 wherein the member is a piston, the chamber is a cylinder and the variable is an expandable gas which is adapted to be applied to one end of the piston.

6. The apparatus as defined in claim 1 wherein the member is a piston, the chamber is a cylinder and the variable is a force resulting from a difference in expansion of two fixed volumes of gases each one of which is applied to a different end of the piston and which are each subject to a different temperature.

7. The apparatus as defined in claim 1 wherein the means for rotating said member is a stator and said stator is aligned with an armature which forms an integral part of said member.

8. The apparatus as defined in claim 1 wherein the sensing means is a variable capacitor.

9. The apparatus as defined in claim 1 wherein the member is a piston and the chamber is a cylindrical sleeve, the sensing means is a variable capacitor comprised of a conductive band extending about said piston and spaced apart arcuate shaped metallic coatings on the inner wall of said cylindrical sleeve.

10. The apparatus as defined in claim 1 wherein the means employed for rotating said member is a stator which transmits magnetic forces to an armature position in said member and wherein the magnetic forces which the stator applies to the armature in the piston is of a value that is equal to and in a direct opposite direction from the force being applied by said variable to said piston.

* * * * *